US011712970B2

United States Patent
Kooijman

(10) Patent No.: US 11,712,970 B2
(45) Date of Patent: Aug. 1, 2023

(54) ELECTRIC OR HYBRID MEANS OF TRANSPORT WITH A SOLAR PANEL

(71) Applicant: ATLAS TECHNOLOGIES HOLDINGS B.V., Helmond (NL)

(72) Inventor: Tom Kooijman, Eindhoven (NL)

(73) Assignee: ATLAS TECHNOLOGIES HOLDING B.V., Helmond (NL)

( * ) Notice: Subject to any disclaimer, the term of this patent is extended or adjusted under 35 U.S.C. 154(b) by 34 days.

(21) Appl. No.: 17/594,375

(22) PCT Filed: May 12, 2020

(86) PCT No.: PCT/EP2020/063201
§ 371 (c)(1),
(2) Date: Oct. 13, 2021

(87) PCT Pub. No.: WO2020/229475
PCT Pub. Date: Nov. 19, 2020

(65) Prior Publication Data
US 2022/0185119 A1  Jun. 16, 2022

(30) Foreign Application Priority Data
May 13, 2019  (NL) .................................... 2023114

(51) Int. Cl.
*B60L 8/00* (2006.01)
*B60L 58/10* (2019.01)
(Continued)

(52) U.S. Cl.
CPC ................ *B60L 8/003* (2013.01); *B60L 1/14* (2013.01); *B60L 3/04* (2013.01); *B60L 58/10* (2019.02);
(Continued)

(58) Field of Classification Search
CPC .. B60L 8/003; B60L 58/10; B60L 1/14; B60L 3/04; B60L 2210/10; H02J 7/0013; H02J 7/35; H02J 2300/26
See application file for complete search history.

(56) References Cited

U.S. PATENT DOCUMENTS

2011/0162897 A1* 7/2011 Syed ....................... B60L 50/16
                                                         180/2.2
2016/0075243 A1* 3/2016 Okumura ................ B60L 8/003
                                                         318/139
(Continued)

FOREIGN PATENT DOCUMENTS

| CN | 107248778 A | 10/2017 |
| DE | 102015000593 A1 | 7/2016 |
| WO | 2010/083408 A1 | 7/2010 |

OTHER PUBLICATIONS

International Search Report and Written Opinion dated Sep. 9, 2020, corresponding to Application No. PCT/EP2020/063201.
(Continued)

*Primary Examiner* — Jared Fureman
*Assistant Examiner* — Duc M Pham
(74) *Attorney, Agent, or Firm* — Patterson + Sheridan, LLP

(57) ABSTRACT

The invention relates to an electric or hybrid means of transport comprising a high voltage bus and a low voltage bus. The high voltage bus is for delivering energy to at least one propulsion motor. The low voltage bus is for delivering energy to parts operating at low voltage. The electric or hybrid means of transport is equipped with a solar panel, the panel comprising groups of solar cells connected to a primary bus of an associated distributed maximum power point tracker. The distributed maximum power point tracker having a secondary bus to exchange energy with other distributed maximum power point trackers. The secondary
(Continued)

bus of at least one of the distributed maximum power point tracker is connected to the low voltage bus, thereby eliminating the need for a DC/DC converter between the high voltage bus and the low voltage bus.

13 Claims, 3 Drawing Sheets

(51) Int. Cl.
*B60L 1/14* (2006.01)
*B60L 3/04* (2006.01)
*H02J 7/00* (2006.01)
*H02J 7/35* (2006.01)

(52) U.S. Cl.
CPC .......... *H02J 7/0013* (2013.01); *H02J 7/0031* (2013.01); *H02J 7/35* (2013.01); *B60L 2210/10* (2013.01); *H02J 2300/26* (2020.01)

(56) References Cited

U.S. PATENT DOCUMENTS

| | | | |
|---|---|---|---|
| 2016/0101704 A1* | 4/2016 | McCalmont | B60L 53/51 |
| | | | 320/101 |
| 2017/0063290 A1* | 3/2017 | Kurlagunda | B60L 8/003 |
| 2018/0297476 A1 | 10/2018 | Malek et al. | |

OTHER PUBLICATIONS

Van Der Ham A J et al., "A distributed maximum power point tracking system for solar electric vehicles", 2017 19th European Conference on Power Electronics and Applications (EPE'17 ECCE Europe), Jointly Owned IEEE-PELS and EPE Association, Sep. 11, 2017 (Sep. 11, 2017), XP033250544.

* cited by examiner

ELECTRIC OR HYBRID MEANS OF TRANSPORT WITH A SOLAR PANEL

TECHNICAL FIELD OF THE INVENTION

The invention relates to an electric or hybrid means of transport comprising a high voltage bus and a low voltage bus, the high voltage bus for delivering energy to at least one propulsion motor, the low voltage bus for delivering energy to parts operating at low voltage, the electric or hybrid means of transport equipped with a solar panel, the solar panel comprising one or more strings, each string comprising multiple groups of solar cells, the groups connected in series, each group comprising a multitude of solar cells, the solar cells connected in series, each group connected to a primary bus of an associated Distributed Maximum Power Point Tracker, the Distributed Maximum Power Point Tracker having a secondary bus to exchange energy with other Distributed Maximum Power Point Trackers, the Distributed Maximum Power Point Tracker thus capable to vary the current though the group with which it is associated, as a result of which the current through each group can differ from the current through other groups that are part of the same string.

ACKNOWLEDGEMENT

The project leading to this application has received funding from the European Union's Horizon 2020 research and innovation program under grant agreement No. 848620.

BACKGROUND OF THE INVENTION

Electric of hybrid means of transport (such as a Battery Electric Vehicle -BEV-, a hybrid vehicle, an electric boat, or a hybrid boat) are well-known. Typically, such a means of transport has a battery pack of, for example, Li-ion cells, the battery pack connected to a high voltage bus, and one or more electric propulsion (traction) motors powered from the high voltage bus. High voltage is here used to indicate that the bus voltage exceeds the safe voltage limit, typically defined as 60 $V_{dc}$ or 48 $V_{ac}$. Such a means of transport also has a low voltage bus, connected to, in the case of vehicles (cars and trucks), for example internal lighting, car audio system, airbags, seat heating, the mandatory external lights such as braking lights, and a battery (typically a lead-acid type battery) and in the case of boats, for example marine radio, sonar, internal and external lighting, etc. This low voltage bus operates at a safe voltage, typically 12 volts or 24 volts, although other voltages are known to be used. The high voltage battery pack is often charged with a charger, that connects the vehicles high voltage bus with the grid. It is noted that hybrid vehicles are known that use an internal combustion engine to charge the high voltage batteries and/or act as a secondary traction engine. A (bi-directional) DC/DC converter is used to charge (power) the low voltage bus from the high voltage bus or vice versa. Such a converter typically should be able to deliver a power of 12V/100 A or more (12V/250 A is known to be used in battery electric cars).

Lately solar vehicles (cars, trucks and boats) are that at least partly use solar cells (photovoltaic cells) mounted on the vehicle to charge the vehicle, for example the solar car 'Lightyear One' from Atlas Technologies BV, Helmond, the Netherlands.

When illuminated, a solar cell typically delivers a current of several amperes at a voltage of approximately 0.6 volt, depending on the illumination, the size of the cell, etc. The power that is generated depends on the load: obviously the power is zero when the cell is shorted, and zero when no current is drawn from the cell. The power is thus a function of the load impedance. The voltage at maximum power is not a constant either but depends, among others, from illumination. Therefore, the load impedance for optimum power varies. Cells are connected in what is often named a string as for most uses a voltage much higher than the voltage of one cell is needed.

It is known to use a so-named Maximum Power Point Tracker (MPPT) to load a string with the optimal impedance to harvest as much energy from the string as possible.

As many cells (typically 70 or more) are connected in series, the current in the string is governed by the cell generating the least current, for example due to low local illumination, as a result of shadow, bird droppings, or different orientations of the cells with respect to the sun. This not only reduces the efficiency of the affected strings drastically, but also that of the solar panel as a whole.

To remedy this the string is divided into groups of cells in series, each group (also known as a sub-string) connected to an associated Distributed Maximum Power Point Tracker (DMPPT, also known as a subMIC). The groups and the associated Distributed Maximum Power Point Trackers are connected in series to form the string. Not only can the Distributed Maximum Power Point Trackers load the group with the optimum impedance for that group, but energy from one group can be transferred to another group using the Energy Exchange Bus. The current in each group can thus be chosen independent from the current through other groups in the string, and thus also independent from the string current. In other words: the Distributed Maximum Power Point Tracker can act to extract excess current (transferring energy from the group to the Energy Exchange Bus) or can be used to inject current in the associated group (transferring energy from the Energy Exchange Bus to the group).

It is noted that the number of strings can be larger than one, and that the Distributed Maximum Power Point Tracker from one string can transfer energy to a Distributed Maximum Power Point Tracker of another string.

For a more detailed discussion of the principles and working of a Distributed Maximum Power Point Tracker see "Architectures and Control of Submodule Integrated DC-DC Converters for Photovoltaic Applications", C. Olalla et al., IEEE TRANSACTIONS ON POWER ELECTRONICS, Vol. 28, No. 6, June 2013, further referred to as Olalla [-1-] and "A distributed maximum power point tracking system for solar electric vehicles", A. J. van der Ham et al., 19th European Conference on Power Electronics and Applications (EPE'17 ECCE Europe), Warsaw, 2017, pp. P. 1-P. 10, further referred to as Van der Ham [-2-]. Van der Ham [-2-] specifically targets the use of Distributed Maximum Power Point Trackers in solar cars.

A disadvantage of the prior art electric or hybrid means of transport is the heavy and costly bi-directional DC/DC converter needed between the high voltage bus and the low voltage bus.

SUMMARY OF THE INVENTION

The invention intends to provide a lighter and cheaper means of transport employing solar cells and Distributed Maximum Power Point Trackers.

To that end the means of transport according to the invention is characterized in that the secondary busses of at least one of the distributed maximum power point trackers is connected to the low voltage bus, thereby eliminating the need for a bi-directional DC/DC converter between high voltage bus and low voltage bus.

As mentioned before a battery operated vehicle typically has a bi-directional DC/DC converter between the high voltage and the low voltage bus, mainly for transferring energy from the high voltage bus to the low voltage bus, but sometimes the other way around. The invention is based on the insight that the Distributed Maximum Power Point Trackers can act as bi-directional converters. It is noted that this does not imply that each Distributed Maximum Power Point Tracker should be able to deliver the full power for which a prior art bi-directional DC/DC converter is dimensioned, as there are a multitude of Distributed Maximum Power Point Trackers.

In hindsight it might look like an obvious solution, but when designing a commercial solar car it is typically derived from the design of an existing BEV, with as little changes in the common electronics and mechanics as possible. Also, when designing a Distributed Maximum Power Point Tracker, it is not obvious to design a Distributed Maximum Power Point Tracker with a secondary bus voltage that equals the voltage of the low voltage bus.

In an embodiment of the electric or hybrid means of transport according to the invention the parts operating at low voltage comprise parts from the group of low voltage batteries, air conditioning, internal and external illumination, mandatory external lights, car media system, air bags, and seat heaters.

All these components are well known and often used in cars and trucks. Typically, they operate at 12V, as for modern cars 12 V is the standard low voltage bus voltage, and the low voltage battery is typically a lead-acid battery. However, other voltages are or have been used.

In another embodiment of the electric or hybrid means of transport according to the invention the high voltage bus is connected to high voltage batteries.

Typically, in a solar means of transport, the high voltage bus is via a battery management system connected to the high voltage batteries, for example a multitude of interconnected (series and parallel connected) Li-ion batteries. The maximum voltage of the strings is often chosen to be lower than the nominal voltage of the high voltage bus and is brought to this level using a DC/DC converter (insulating or non-insulating).

In still another embodiment of the electric or hybrid means of transport according to the invention the high voltage bus is galvanically insulated from the low voltage bus.

For safety reasons it is in cars and trucks mandatory to galvanically insulate the high voltage bus from the chassis. The Distributed Maximum Power Point Trackers must therefore maintain a galvanic insulation between the primary side (connected to the solar cells and the high voltage bus) and the secondary side (which is galvanically connected to the chassis).

In yet another embodiment of the electric or hybrid means of transport according to the invention the circuitry comprising the Distributed Maximum Power Point Trackers further comprises safety circuitry that disconnects one or more groups and/or strings in error situations.

As an alternative the circuitry comprising the Distributed Maximum Power Point Trackers further comprises safety circuitry that shorts one or more groups and/or strings in error situations.

During emergencies, for example after a crash, it might be necessary to remove (at least partly) the roof of a car or truck by an emergency response team to free the passengers. Typically, this involves cutting through a pillar, where in a solar car the high voltage bus or the connection between the groups may be located. To avoid electrocution risks, the groups and/or strings should be disconnected from each other, or the groups and/or should be shorted. This can well be done with electronics to be integrated in the electronics board of the Distributed Maximum Power Point Tracker. For a further description of such safety circuitry see international patent application publication WO2010/078303A2 and Dutch patent application 2021633. Integrating the circuitry for this functionality hardly increases price, while increasing safety.

BRIEF DESCRIPTION OF THE DRAWINGS

The invention is now elucidated using figures, in which identical reference signs indicate corresponding features. To that end.

DETAILED DESCRIPTION OF THE INVENTION

It is noted that the invention is elucidated using figures for an electric car employing a solar panel (a solar car) but the figures are equally valid for a solar truck or a boat or, more general, a solar means of transport.

Figure 1:
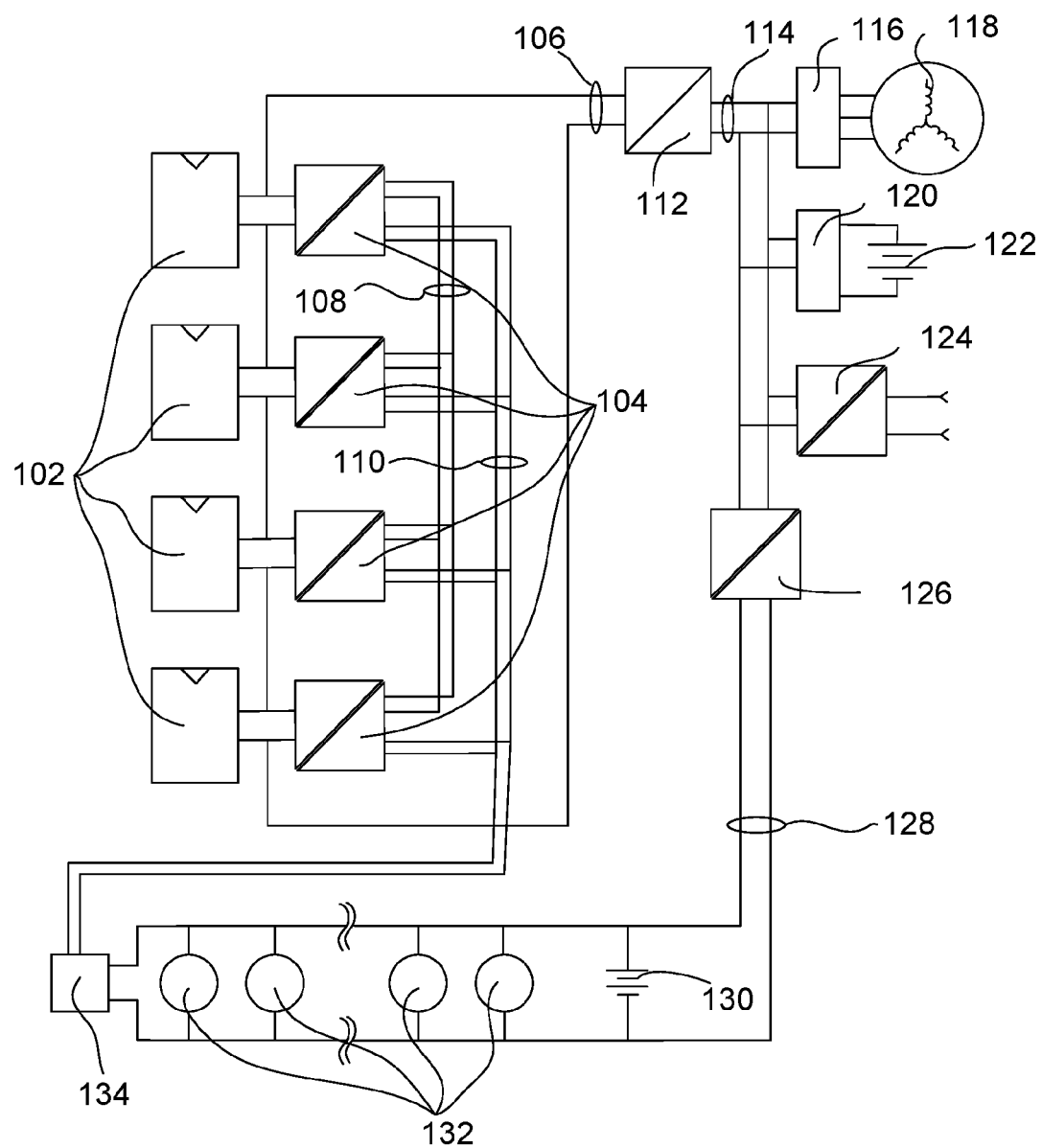
FIG. 1 schematically shows an electric model of a solar car as derived from Van der Ham [2], FIG. 2 schematically shows an electric model of a solar car according to an embodiment of the invention.

FIG. 1 schematically shows an electric schedule of a solar car as derived from Van der Ham [-2-].

FIG. 1 shows several groups of solar cells 102, each of these groups connected with an associated Distributed Maximum Power Point Tracker 104. Groups 102 are connected in series, thereby forming a string, the output of the string connected to a string voltage bus 106. It is noted that the string voltage is in many cases also a high voltage, that is: a voltage exceeding the safe voltage limit of $60V_{dc}$.

One side of each Distributed Maximum Power Point Tracker 104, the primary side, is connected to the group associated with that Distributed Maximum Power Point Tracker. The other side, the secondary side, is connected to the Energy Exchange Bus 108. For diagnostics, and other possible uses, such as monitoring of currents, the Distributed Maximum Power Point Tracker shows a communication bus 110.

The string voltage bus 106 is connected via DC/DC converter 112 and a battery management system 120 to high voltage batteries 122, typically a Li-ion battery pack.

Also shown is a motor controller 116 connected with the high voltage bus, generating the voltages for the (electric) traction motor 118, for example a permanent magnet motor. It is noted that more than one motor may be used (typically each motor having its own motor controller). It is also noted that the motor may be any type of motor for propelling the vehicle (or boat), brushed or brushless, etc., as long as it is an electric motor.

A DC/DC converter 126 connects the high voltage bus 114 with the low voltage bus 128, which in turn is connected to low voltage battery 130 (typically a lead-acid battery) and a multitude of low voltage users 132 (airconditioning, audio system, lighting, etc.). As the voltage at the low voltage side of this DC/DC converter 126 is fixed to, for example, 13.6

V, the converter can charge the low voltage battery 130 if the load condition of the low voltage battery demands loading.

A Distributed Maximum Power Point Tracker Controller 134 controls the Distributed Maximum Power Point Trackers 104 via communication bus 110, for example disabling the groups 102 during service or error conditions (for example indicated by activated airbags) etc. For a further description of the working of such safety circuitry see international patent application publication WO2010/078303A2 and Dutch patent application 2021633.

DC/DC converter 112 loads the string bus 106. It can be that the high voltage bus 114 cannot absorb much power, for example because the high voltage battery is fully loaded, and the low voltage bus 128 is idle. If this is the case, no or little current is drawn from the string(s). If the high voltage battery needs charging, the Distributed Maximum Power Point Trackers will see to it that the solar groups are optimally loaded, and as much power is generated as possible.

DC/DC converter 126 feeds the low voltage bus 128 from the high voltage bus 114.

It is noted that Distributed Maximum Power Point Tracker Controller 134 can also control, for example, the DC/DC converters 112 and 126.

Figure 2:
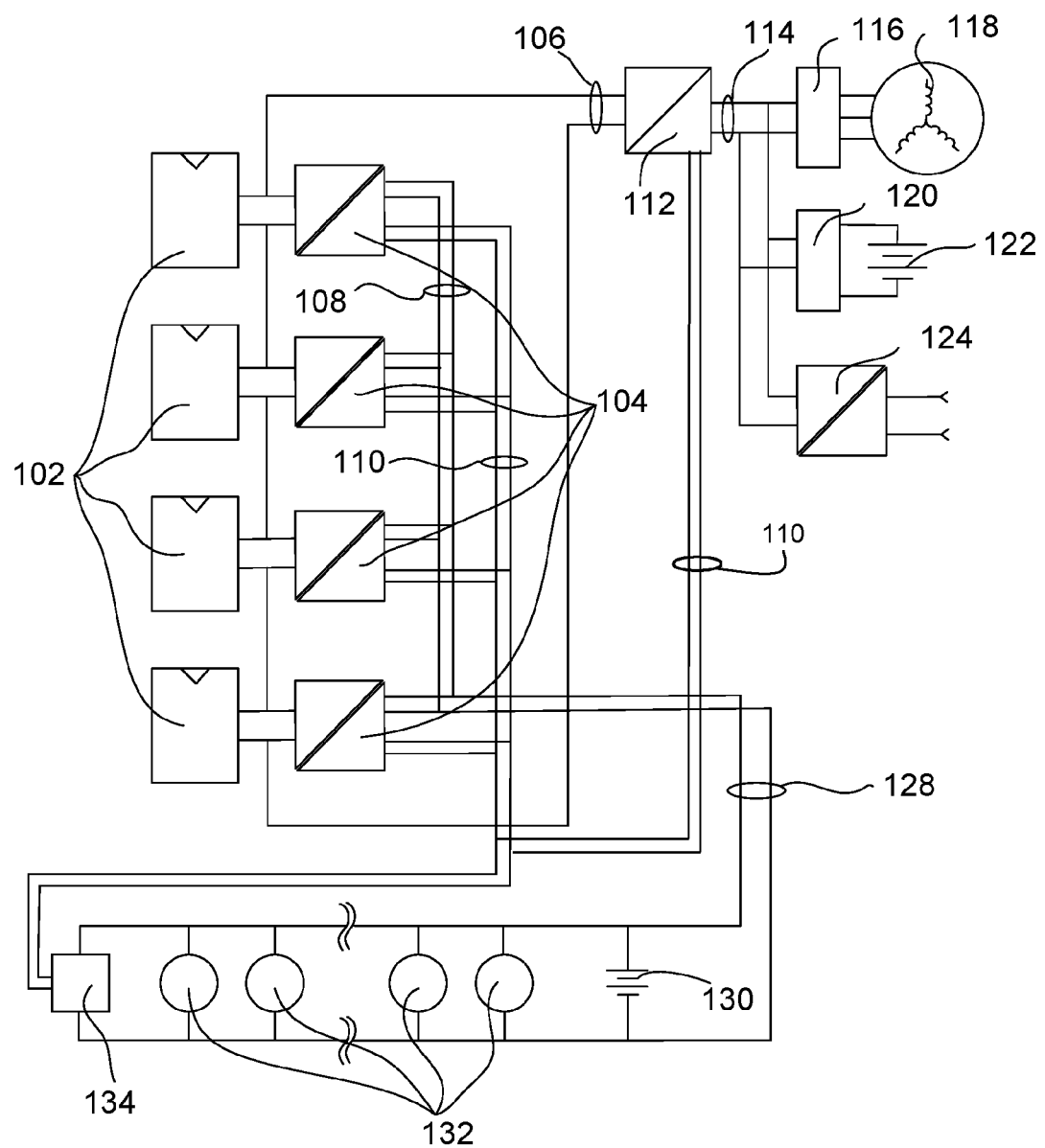

FIG. 2 schematically shows an electric model of a solar vehicle according to an embodiment of the invention.

FIG. 2 can be thought to be derived from FIG. 1. However, in contrast to FIG. 1, the Energy Exchange Bus 108 shown in FIG. 2 is connected to the low voltage bus 128, and DC/DC converter 126 shown in FIG. 1 is deleted.

In accordance with the present invention, if the low voltage bus needs power, this power can be derived from the Energy Exchange Bus 108. It can be pointed out that such a power flow cannot be realized using the electric circuitry shown in FIG. 1. As such, the Energy Exchange Bus 108 as applied in the present invention serves a dual purpose.

In particular, the Energy Exchange Bus 108 as applied in the present invention can be used to transfer energy from one group to another group. In such operating mode, the current in each group can thus be chosen independent from the current through other groups in the string, and thus also independent from the string current. In other words: the Distributed Maximum Power Point Tracker associated with a particular group of the string can act to extract excess current (transferring energy from the group to the Energy Exchange Bus) or can be used to inject current in the associated group (transferring energy from the Energy Exchange Bus to the group).

In addition, the Energy Exchange Bus 108 as applied in the present invention can be used to power the low voltage bus 128. By providing a connection between the Energy Exchange Bus 108 and the low voltage bus 128, to which the low voltage battery 130 is connected, the low voltage battery 130 can be powered using power generated by the solar power cells, via the DMPPTs, in particular via the Energy Exchange Bus 108 connecting the DMPPTs. Such an operation can be realized by a suitable control of the DMPPTs, e.g. by the Distributed Maximum Power Point Tracker Controller 134. In particular, the Distributed Maximum Power Point Tracker Controller 134 can be configured to control the DMPPTs so as to enable a power flow towards the low voltage battery 130 or other parts or components connected to the low voltage bus 128.

In addition, in case the energy need of the low voltage bus 128 is larger than the power generated by the solar cells, power can be drawn from the high voltage battery 122 via DC/DC converter 112 and the (high voltage) string bus 106 through the Distributed Maximum Power Point Trackers 104 to the Energy Exchange Bus 108. By providing a connection between the Energy Exchange Bus 108 and the low voltage bus 128, power can be transferred from the high voltage battery 122 towards the low voltage bus 122, without the use of a bi-directional DC/DC converter, such as DC/DC converter 126 shown in FIG. 1; i.e. a bi-directional DC/DC converter directly connecting the high voltage bus 114 to the low voltage bus 128. As such, the application of the connection between the Energy Exchange Bus 108 and the low voltage bus 128 eliminates the need for a bi-directional DC/DC converter connecting the high voltage bus to the low voltage bus. In accordance with the present invention, power can thus be transferred from the high voltage bus 114 to the low voltage bus 128 by suitable control of the DC/DC converter 112 and the DMPPTs. Such control of the DC/DC converter 112 and the DMPPTs can be provided by the Distributed Maximum Power Point Tracker Controller 134 via the communication bus 110. As indicated in FIG. 2, the Distributed Maximum Power Point Tracker Controller 134 can provide suitable control signals to the DC/DC converter 112 and the DMPPTs via the communication bus 110.

In the embodiment as shown in FIG. 2, the Energy Exchange bus 108 is directly connected to the low voltage bus 128. This thus implies that the Distributed Maximum Power Point Trackers are designed such that their secondary bus voltage, which is connected to the Energy Exchange bus 108, substantially equals the nominal voltage of the low voltage bus 128. Note that in general a DMPPT would be designed such that its secondary voltage, i.e. the secondary bus voltage applied to the Energy exchange bus 108 would be in the same range as the string voltage. In particular, the secondary bus voltage can e.g. be selected somewhat lower or somewhat higher such that a high-efficient Buck or Boost converter topology can be applied. In the present invention, the secondary bus voltage needs to be selected so as to substantially match the voltage of the low voltage bus 128. The voltage of the low voltage bus 128 can e.g. be 12 V or 48 V, i.e. typical battery voltages.

As an alternative to directly connecting the Energy exchange bus 108 directly to the low voltage bus 128, it can be considered to apply a DC/DC converter to connect the Energy exchange bus 108 to the low voltage bus 128.

Figure 3:
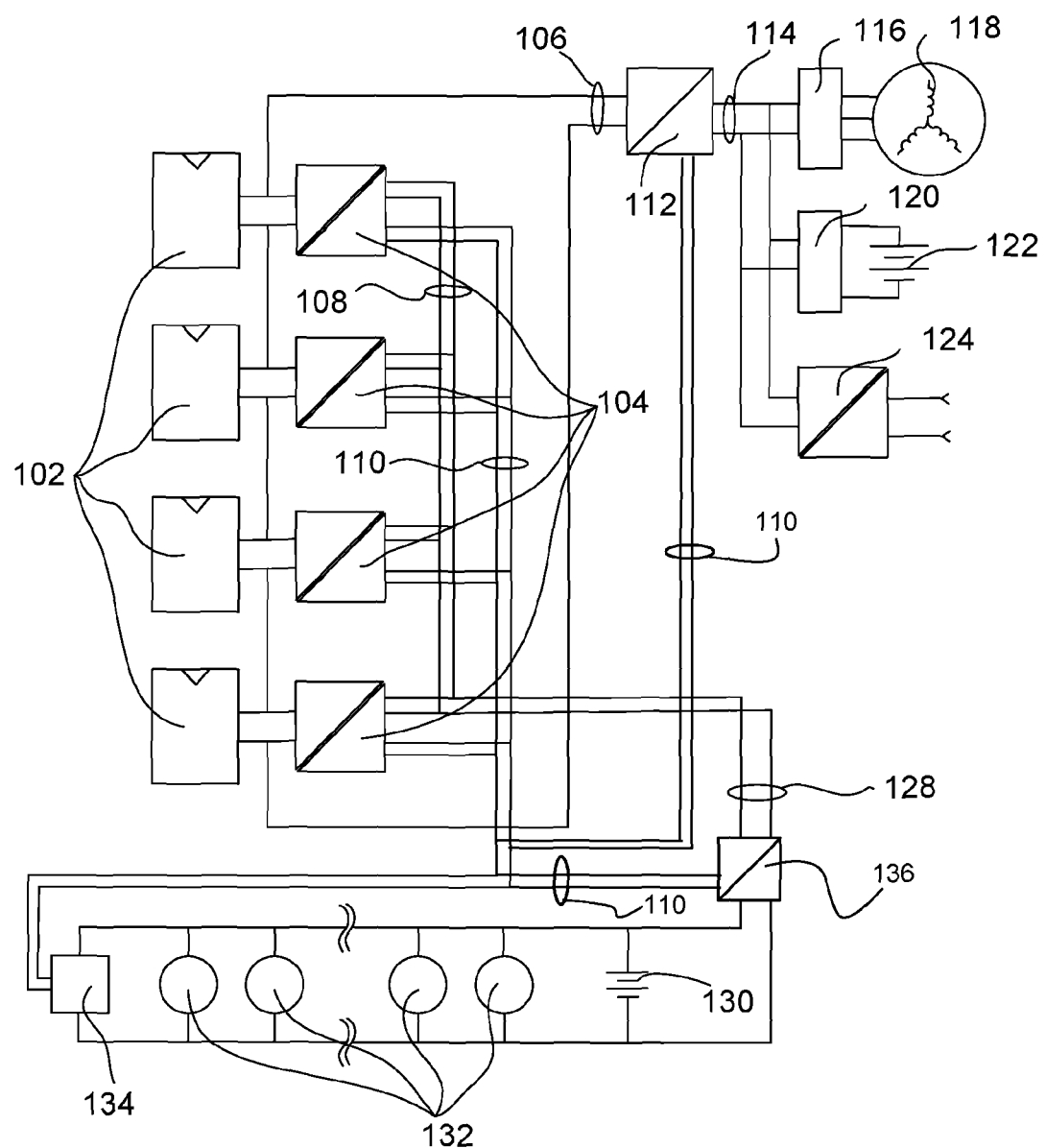
FIG. 3 schematically shows an electric model of a solar car according to another embodiment of the invention.

Such an embodiment is schematically shown in FIG. 3.

FIG. 3 schematically shows an electric model of a solar vehicle according to the invention. FIG. 3 can be thought to be derived from FIG. 2. However, in contrast to FIG. 2, the Energy Exchange Bus 108 shown in FIG. 3 is connected to the low voltage bus 128 via a DC/DC converter 136.

The application of the DC/DC converter 136 as shown in FIG. 3 provides an increased design freedom for both the DMPPTs, in particular the applied voltage on the Energy Exchange bus 108, and the low voltage bus 128. By the implementation of the DC/DC converter 136, the nominal voltage of the Energy Exchange Bus 108 and the nominal voltage of the low voltage bus 128 can be chosen or designed independently of each other. Any differences between the selected or designed nominal voltages can then be anticipated by the DC/DC converter 136. As further illustrated in FIG. 3, the DC/DC converter 136 may also be controlled by the Distributed Maximum Power Point Tracker Controller 134, by providing a suitable control signal to the DC/DC converter 136 via the communication bus 110. It can further be pointed out that the design of a DC/DC converter 136 may be substantially different from a design of a DC/DC converter 126 as shown in FIG. 1. As will be apparent to the skilled person, the DC/DC converter 126 needs to provide a conversion between a comparatively high voltage, i.e. the nominal voltage of the high voltage bus 114 and a comparatively low voltage, i.e. the nominal voltage of the low voltage bus 128. On the other hand, the DC/DC converter 136 needs to provide a conversion between a nominal voltage of the Energy Exchange Bus 108 and the nominal voltage of the low voltage bus 128. This will typically be a much smaller voltage difference than the voltage difference between the high voltage bus 114 and the low voltage bus 128. As such, the DC/DC converter 136 can be designed smaller and lighter compared to the DC/DC converter 126. Such a smaller and lighter design can be considered advantageous, in particular when applied in a vehicle or transport means. Clearly, as will be apparent to the skilled person, a design as schematically shown in FIG. 2, whereby a DC/DC converter between the Energy Exchange Bus 108 and the low voltage bus 128 is not required, can provide further advantages w.r.t. weight and required volume, in addition to an improved efficiency, due to the absence of the DC/DC converters 126 and 136.

If both the low voltage batteries and the high voltage batteries are fully loaded, and the solar cells are irradiated (so: they can generate power), the DC/DC converter 112 and the Distributed Maximum Power Point Trackers can stop transferring power, effectively loading the solar cells at their open voltage point. This can be controlled by Distributed Maximum Power Point Tracker Controller 134.

The Distributed Maximum Power Point Tracker Controller 134 can also be used to divide the power generated by the solar cells between the low voltage bus and the high voltage bus.

NON-PATENT LITERATURE CITATIONS

[-1-] "Architectures and Control of Submodule Integrated DC-DC Converters for Photovoltaic Applications", C. Olalla et al., IEEE TRANSACTIONS ON POWER ELECTRONICS, Vol. 28, No. 6, June 2013.
[-2-] "A distributed maximum power point tracking system for solar electric vehicles", A. J. van der Ham et al., 19$^{th}$ European Conference on Power Electronics and Applications (EPE'17 ECCE Europe), Warsaw, 2017, pp. P. 1-P. 10.

The invention claimed is:

1. An electric or hybrid means of transport comprising a high voltage bus and a low voltage bus, the high voltage bus for delivering energy to at least one propulsion motor, the low voltage bus for delivering energy to parts operating at low voltage, the electric or hybrid means of transport equipped with a solar panel, the solar panel comprising one or more strings, each string comprising multiple groups of solar cells, the groups connected in series, each group comprising a multitude of solar cells, each group connected to a primary bus of an associated distributed maximum power point tracker, the distributed maximum power point tracker having a secondary bus to exchange energy with other distributed maximum power point trackers, the distributed maximum power point tracker thus capable to vary the current through the group with which it is associated, as a result of which the current through each group can differ from the current through other groups that are part of the same string characterized in that the secondary bus of at least one of the distributed maximum power point tracker is connected to the low voltage bus, thereby enabling a transfer of power from the high voltage bus to the low voltage bus via the secondary bus.

2. The electric or hybrid means of transport according to claim 1, whereby an output of the one or more strings is connected to a string voltage bus.

3. The electric or hybrid means of transport according to claim 2, further comprising a DC/DC converter connecting the string voltage bus to the high voltage bus.

4. The electric or hybrid means of transport according to claim 1, further comprising a Distributed Maximum Power Point Tracker Controller configured to control the distributed maximum power point trackers.

5. The electric or hybrid means of transport according to claim 4, whereby an output of the one or more strings is connected to a string voltage bus, and further comprising a DC/DC converter connecting the string voltage bus to the high voltage bus, whereby the Distributed Maximum Power Point Tracker Controller is configured to control the DC/DC converter.

6. The electric or hybrid means of transport according to claim 5, whereby the Distributed Maximum Power Point Tracker Controller is configured to control the transfer of power from the high voltage bus to the low voltage bus.

7. The electric or hybrid means of transport according to claim 5, further comprising a further DC/DC converter connecting the secondary bus to the low voltage bus.

8. The electric or hybrid means of transport according to claim 7, whereby the Distributed Maximum Power Point Tracker Controller is further configured to control the further DC/DC converter.

9. The electric or hybrid means of transport of claim 1, where the parts operating at low voltage comprise parts from the group of low voltage batteries, air conditioning, internal and external illumination, mandatory external lights, car media system, air bags, and seat heaters.

10. The electric or hybrid means of transport of claim 1, where the high voltage bus is connected via a battery management system to high voltage batteries.

11. The electric or hybrid means of transport of claim 1, where the high voltage bus is galvanically insulated from the low voltage bus.

12. The electric or hybrid means of transport of claim 1, in which the circuitry comprising the distributed maximum power point trackers further comprises safety circuitry that disconnects one or more groups and/or strings in error situations.

13. The electric or hybrid means of transport of claim 1, in which the circuitry comprising the distributed maximum power point trackers further comprises safety circuitry that shorts one or more groups and/or strings in error situations.

* * * * *